United States Patent [19]
Coelho

[11] Patent Number: 5,977,986
[45] Date of Patent: *Nov. 2, 1999

[54] IMAGE ENCODING FOR FASTER DECODING

[75] Inventor: Rohan Coelho, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/568,024

[22] Filed: Dec. 6, 1995

[51] Int. Cl.$^6$ ................................................ G06F 15/00
[52] U.S. Cl. ............................................................ 345/435
[58] Field of Search ............................ 395/135; 345/113, 345/114, 115, 116, 435

[56] References Cited

U.S. PATENT DOCUMENTS 5,594,850   1/1997   Noyama et al. ......................... 395/135

*Primary Examiner*—Phu K. Nguyen
*Attorney, Agent, or Firm*—William H. Murray; N. Stephan Kinsella

[57] ABSTRACT

Image data to be processed multiple times for display is encoded to provide faster display processing. For example, an original image having pixels that may be either transparent or non-transparent may be displayed multiple times within a single display and/or over successive displays. Rather than having to determine pixel transparency on a pixel-by-pixel basis each and every time the image is to be processed for display, the original image is encoded to generate an encoded image. The encoding process involves grouping the original image pixels into sets and characterizing the transparencies of the pixels of each set. A code signal representing the results of the characterization of each set of pixels is then encoded into the encoded image, along with the original image pixels. Each time the original image data is to be processed for display, the encoded image rather than the original image is used as input to special transparency decode processing. During decode processing, the code signals are retrieved from the encoded image and used to determine how to display the corresponding sets of pixels which are also retrieved from the encoded image. In this way, the original image data can be processed for display multiple times without having to perform pixel transparency analysis, one pixel at a time, each time the image is displayed.

51 Claims, 4 Drawing Sheets

TRANSPARENCY ENCODING

FIG. 1. TRANSPARENCY ENCODING

FIG. 2. ORIGINAL IMAGE

| $P_{00}$ | $P_{01}$ | $P_{02}$ | $P_{03}$ | $P_{04}$ | $P_{05}$ | $P_{06}$ | $P_{07}$ | $\vdots$ | $P_{0M}$ |
|---|---|---|---|---|---|---|---|---|---|
| $P_{10}$ | $P_{11}$ | $P_{12}$ | $P_{13}$ | $P_{14}$ | $P_{15}$ | $P_{16}$ | $P_{17}$ | $\vdots$ | $P_{1M}$ |
| .... | .... | .... | .... | .... | .... | .... | .... | .. | .... |
| $P_{N0}$ | $P_{N1}$ | $P_{N2}$ | $P_{N3}$ | $P_{N4}$ | $P_{N5}$ | $P_{N6}$ | $P_{N7}$ | $\vdots$ | $P_{NM}$ |

200

FIG. 3. ENCODED IMAGE

FIG. 4.   TRANSPARENCY DECODING

IMAGE ENCODING FOR FASTER DECODING

BACKGROUND OF THE INVENTION

1. Field of the Invention

The present invention relates to digital signal processing, and, in particular, to encoding images for subsequent decoding and display.

2. Description of the Related Art

Many computer-based image processing applications provide the ability to define portions of an image as being transparent, on a pixel by pixel basis. A particular color may be reserved for transparent pixels. Any pixels of the image that are to be designated as transparent are assigned that reserved color. When the image is processed for display, pixels having the reserved color are not rendered (i.e., copied) to the display buffer for display on a computer monitor. As a result, only non-transparent pixels (i.e., those pixels having colors other than the reserved color) will appear on the monitor. This image processing technique is often referred to as chromakeying.

In typical chromakeying, each pixel of the image is compared to the reserved chromakey or transparency color, one by one, to determine whether the pixel is to be rendered to the display buffer. If the pixel is not the reserved color, then the pixel is non-transparent and processing is implemented to render that pixel to the display buffer. Otherwise, the pixel is transparent and processing is implemented to skip the current pixel. The pixel-render processing and the pixel-skip processing may involve the implementation of different sets of program code, one set of which is jumped to based on the results of the comparison of the pixel to the reserved transparency color.

Graphics applications typically build composite displays from different graphics images, each image of which may have both transparent pixels and non-transparent pixels. In some applications, the same image is to be displayed on the monitor more than once. For example, the image may be rendered at different locations within the same display (i.e., at the same time), or it may be repeated over successive updates of the display, either at the same location or at different locations.

For example, in a graphics application, a tile may be repeated at different locations within a single grid of a single display. In addition, that same grid may be repeated over a number of successive updates of the display. As a result, the graphics data for the tile needs to be processed multiple times. If transparency is enabled, under conventional processing schemes, each pixel of the tile is compared to the reserved transparency color to determine whether the pixel is to be rendered to the display buffer. When the tile is repeated multiple times within a single display and/or over multiple displays, the same transparency processing is repeated each time the image is processed for display. This can result in a great deal of redundant processing to determine pixel transparencies, one pixel at a time. Such redundant processing can severely impact the ability of the graphics application to operate efficiently (e.g., limit the rate at which the display can be updated).

What is needed is a processing scheme for graphics and other image data (such as video data) that minimizes redundant processing, such as transparency processing, that would otherwise exist when the same image data is to be rendered multiple times within the same display and/or over successive displays.

It is accordingly an object of this invention to overcome the disadvantages and drawbacks of the known art and to provide image encoding and decoding schemes that reduces such redundant processing.

Further objects and advantages of this invention will become apparent from the detailed description of a preferred embodiment which follows.

SUMMARY OF THE INVENTION

The present invention comprises computer-implemented processes, apparatuses, and storage mediums encoded with machine-readable computer program code for processing signals. According to a preferred embodiment, encoded image signals corresponding to an image are provided, wherein the encoded image signals comprise pixels and code signals and each code signal corresponds to two or more different pixels of the image. A current code signal is retrieved from the encoded image signals and a current set of two or more pixels corresponding to the current code signal are retrieved from the encoded image signals. The current set of pixels is processed for display based on the current code signal. The retrieving and processing steps are repeated for other code signals and other sets of pixels.

According to another preferred embodiment of the present invention, an image is provided. A current set of two or more pixels of the image is characterized and a current code signal is generated based on the characterization of the current set of pixels. Encoded image signals are generated comprising the current code signal and the current set of pixels. The characterization of pixels and generation of code signals are repeated for other sets of pixels.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

In video processing, a codec (short for "compressor/decompressor") is used to compress video signals for efficient transmission and/or storage and for efficient decompression during playback. One of the primary goals of a codec is to reduce the number of bits used to represent a sequence of video images so that the compressed data can be transmitted over a transport medium having limited bandwidth and/or stored to a memory device having limited storage capacity.

The present invention is directed to endecs (short for "encoder/decoder") for image processing. One of the primary goals of the endecs of the present invention is to provide efficient decoding of encoded image data for fast display of the decoded images. Although an endec of the present invention may generate encoded image data that is also compressed (i.e., having fewer bits than the original image), it is also possible that an endec of the present invention will generate encoded image data that has more bits than the original image data. A goal of the present invention is to provide faster display processing, even at the cost of having to represent the image data using more bits.

Furthermore, unlike a video codec which compresses video signals at signal generation (e.g., capture) time and decompresses the compressed data at playback time, an endec of the present invention may both encode and decode image data at run time during playback. Alternatively, an endec of the present invention may be used to encode image data at signal generation time and decode the encoded image data at playback time.

Moreover, an endec of the present invention may form part of a larger codec. Such an endec may encode during the signal generation processing of the codec and decode during the playback processing of the codec. Alternatively, such an endec may both encode and decode during the playback processing of the codec.

Endec for Transparency Processing

Conventional transparency processing may be represented by the following pseudo-code:

```
For each row of the image {
    For each pixel of the current row {
        If (current pixel = transparency color)    // current pixel is transparent
            Perform processing to skip current pixel
        Else                                       // current pixel is non-transparent
            Perform processing to render current pixel }
        Perform end-of-row processing }
    Perform end-of-image processing
```

Under conventional transparency processing, implementation of this pseudo-code is repeated each and every time the image is processed for display, even if the image is to appear more than once in the same display and even if the image is to appear in successive displays.

Figure 1:
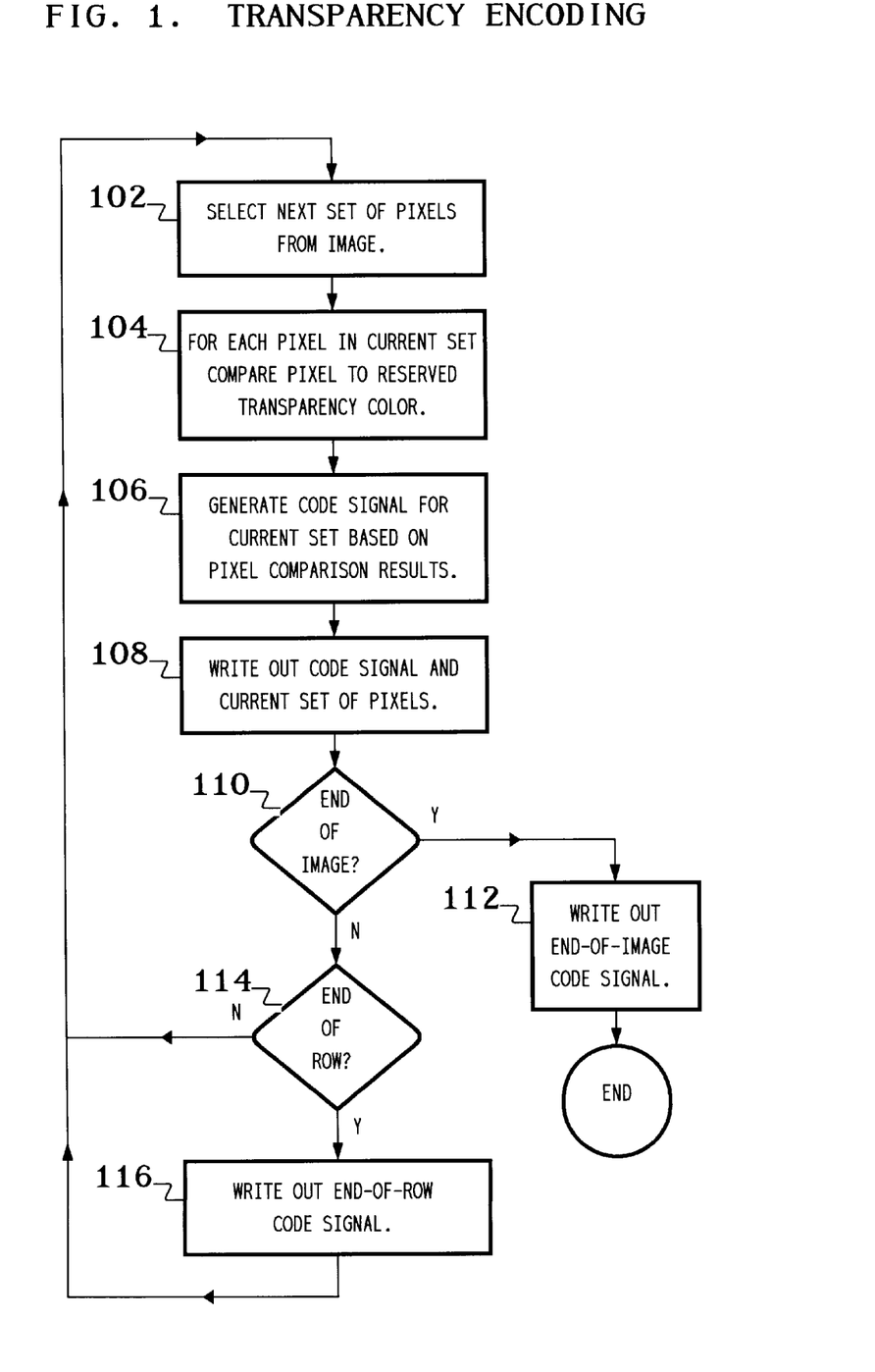
FIG. 1 is a flow diagram of the encode processing of an endec, according to a preferred embodiment of the present invention.

Referring now to FIG. 1, there is shown a flow diagram of the encode processing of an endec, according to a preferred embodiment of the present invention. The endec of FIG. 1 is designed to perform transparency-related processing on pixel images and is just one example of endecs of the present invention. During encode processing, the image is analyzed one set of pixels at a time. The transparencies of the pixels of each set are determined and used to select a code signal for that current set. The code signal and the pixels for current set are written to form part of an encoded image. Once completed, the encoded image is then used as input, rather than the original image, each time the original image data is to be displayed.

In particular, a set of pixels is selected from the image (step 102 of FIG. 1). In a preferred embodiment, each pixel is an 8-bit value and each set contains four consecutive pixels in the same row of the image. Those skilled in the art will understand that four pixels are selected for each set to permit pseudo-SIMD processing techniques to be implemented on four 8-bit pixels at a time using the 32-bit registers of certain Intel® microprocessors.

For each pixel in the current set, the pixel value is compared to the reserved transparency color (step 104). If the pixel value is equal to the transparency color, then the pixel is a transparent pixel that should not be rendered (i.e., should be skipped). Otherwise, the pixel is a non-transparent pixel that is to be rendered. The transparencies of the four pixels of the current set are then used to generate a corresponding code signal (step 106). If the transparencies of the four pixels are represented as T1, T2, T3, and T4, where (Ti=1) for a transparent pixel and (Ti=0) for a non-transparent pixel, then the following code signals may be used to represent the 16 different possible combinations of transparencies for the four pixels of each set:

(Code = 0)  ⇒  (T1, T2, T3, T4) = (0, 0, 0, 0)
(Code = 1)  ⇒  (T1, T2, T3, T4) = (0, 0, 0, 1)
(Code = 2)  ⇒  (T1, T2, T3, T4) = (0, 0, 1, 0)
(Code = 3)  ⇒  (T1, T2, T3, T4) = (0, 0, 1, 1)
(Code = 4)  ⇒  (T1, T2, T3, T4) = (0, 1, 0, 0)
(Code = 5)  ⇒  (T1, T2, T3, T4) = (0, 1, 0, 1)
(Code = 6)  ⇒  (T1, T2, T3, T4) = (0, 1, 1, 0)
(Code = 7)  ⇒  (T1, T2, T3, T4) = (0, 1, 1, 1)
(Code = 8)  ⇒  (T1, T2, T3, T4) = (1, 0, 0, 0)
(Code = 9)  ⇒  (T1, T2, T3, T4) = (1, 0, 0, 1)

-continued (Code = 10) ⇒  (T1, T2, T3, T4) = (1, 0, 1, 0)
(Code = 11) ⇒  (T1, T2, T3, T4) = (1, 0, 1, 1)
(Code = 12) ⇒  (T1, T2, T3, T4) = (1, 1, 0, 0)
(Code = 13) ⇒  (T1, T2, T3, T4) = (1, 1, 0, 1)
(Code = 14) ⇒  (T1, T2, T3, T4) = (1, 1, 1, 0)
(Code = 15) ⇒  (T1, T2, T3, T4) = (1, 1, 1, 1)

The appropriate code signal and the corresponding four pixels are then written to form part of an encoded image (step 108).

If the current set of pixels are the last set of pixels in the last row of the image (step 110), then a special end-of-image code signal (e.g., Code=16) is written to the encoded image (step 112) and transparency encoding for the current image is complete. Otherwise, processing continues to step 114.

If the current set of pixels is not the last set of pixels in the current row of the image (step 114), then processing returns to step 102 to select the next set of pixels in the current row. Otherwise, the current set of pixels are the last set in the current row and a special end-of-row code signal (e.g., Code=17) is written to the encoded image (step 116) before processing returns to step 102 to select the first set of pixels in the next row of the image.

When the transparency encoding of FIG. 1 is complete, an encoded image will have been generated from the original image. The processing of FIG. 1 is implemented once for a given image, no matter how many times the original image data is to be rendered in a single display or in successive displays.

Figure 2:
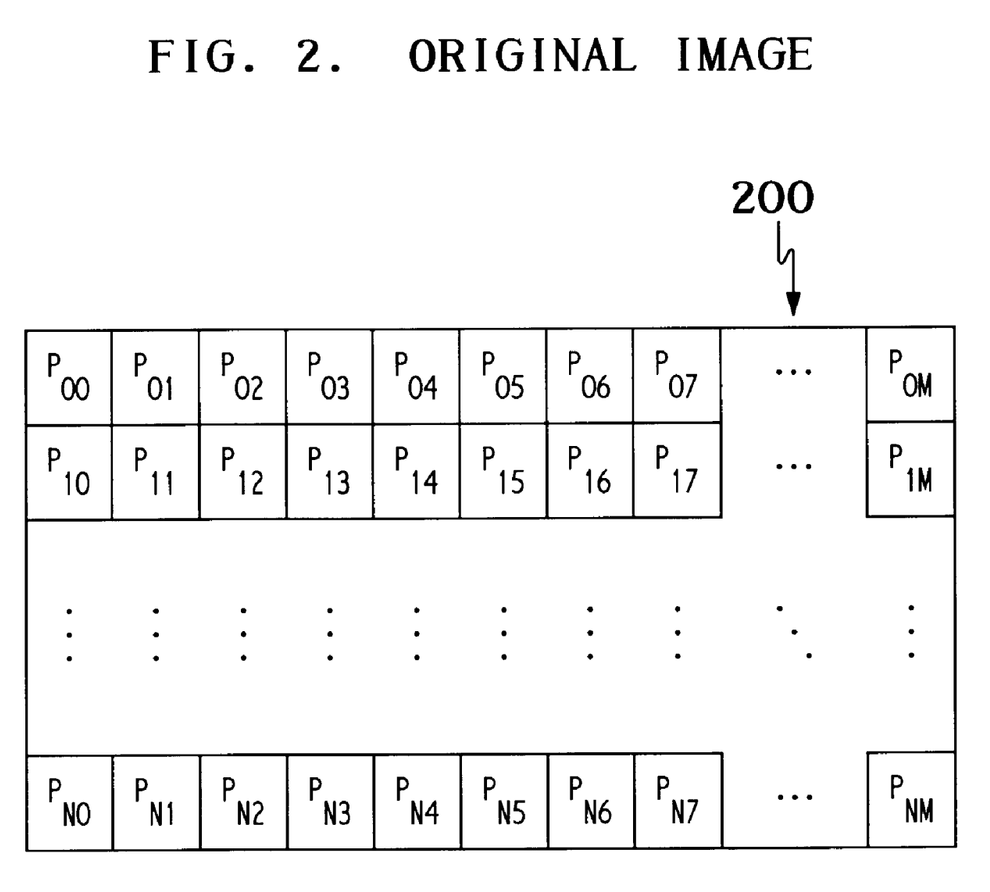
FIG. 2 is a representation of an original image to be encoded using the encode processing of FIG. 1.

Referring now to FIG. 2, there is shown a representation of an original image 200 to be encoded using the encode processing of FIG. 1.

Figure 3:
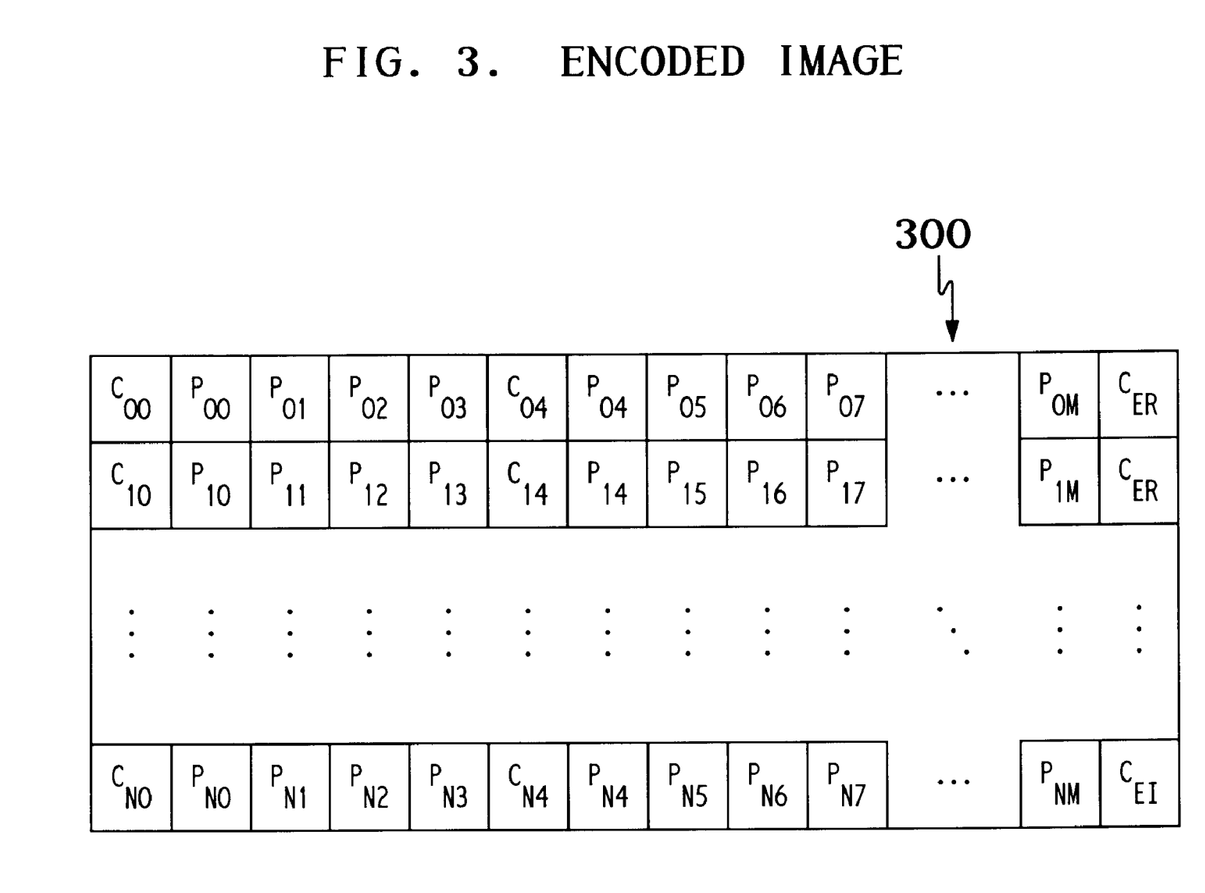
FIG. 3 is a representation of an encoded image generated from the image of FIG. 2 using the encode processing of FIG. 1.

Referring now to FIG. 3, there is shown a representation of an encoded image 300 generated from original image 200 of FIG. 2 using the encode processing of FIG. 1, according to a preferred embodiment of the present invention. As shown in FIG. 3, the first "pixel" in the first row of encoded image 300 is code signal $C_{00}$. Code signal $C_{00}$ is the code signal representing the transparency status of pixels $P_{00}$, $P_{01}$, $P_{02}$, and $P_{03}$, which are the next four "pixels" of the encoded image. Similarly, code signal $C_{04}$ represents the transparencies of pixels $P_{04}$, $P_{05}$, $P_{06}$, and $P_{07}$, which follow code signal $C_{04}$ in encoded image 300. The last "pixel" in the first row of encoded image 300 is code signal $C_{ER}$—the special end-of-row code signal.

This pattern of code signal followed by four pixels with the special end-of-row code signal at the end of each row is repeated for each row of encoded image 300, except for the last row. Instead of the end-of-row code signal $C_{ER}$, the last "pixel" of the last row of encoded image 300 is the special end-of-image code signal $C_{EI}$.

Figure 4:
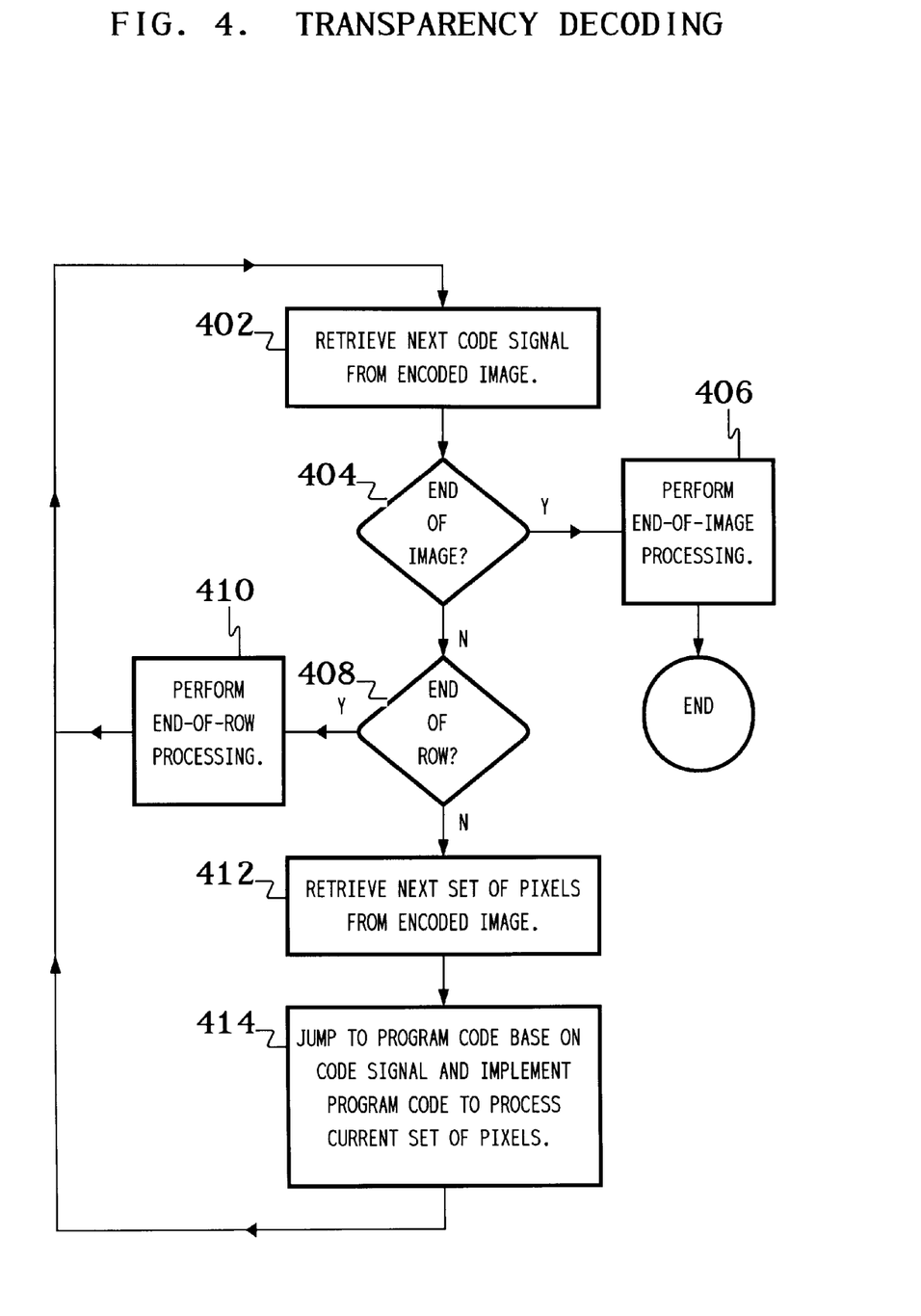
FIG. 4 is a flow diagram of the decode processing of the endec of FIG. 1.

Referring now to FIG. 4, there is shown a flow diagram of the transparency decode processing of the endec of FIG. 1, according to a preferred embodiment of the present invention. The decode processing of FIG. 4 is implemented every time the original image 200 is to be processed for display. In order to avoid redundant processing steps to determine pixel transparency on a pixel-by-pixel basis, the input image to the decode processing of FIG. 4 is the encoded image 300, rather than the original image 200. Transparency decoding uses information stored in the code signals of encoded image 300 to process the image data efficiently when the original image 200 is to be rendered more than once.

In particular, a code signal is retrieved from the encoded image (step 402). When encoded image 300 is the input image, code signal $C_{00}$ is the first code signal retrieved. If the current code signal indicates that the end of the image has been reached (step 404), then any necessary end-of-image processing is performed (step 406) and transparency decode processing for the current image is complete. Otherwise, processing continues to step 408.

If the current code signal indicates that the end of the current row has been reached (step 408), then any necessary end-of-row processing is implemented (step 410) before processing returns to step 402 to read the first code signal of the next row of the encoded image.

Otherwise, the end of the current row has not been reached and the next four pixels are retrieved from the encoded image (step 412). Program code is then implemented to process the current set of four pixels for display (step 414). The particular processing implemented is determined by the code signal retrieved in step 402. In a preferred embodiment, a processing jump is made to program code especially designed to handle the transparency status indicated by the current code signal. In one embodiment, the value of the code signal is a pointer to an appropriate set of program code.

There are sixteen different sets of program code, each one especially designed to handle a different one of the sixteen different possible combinations of transparencies listed above. For example, if the code signal is 3, the corresponding jumped-to program code ensures that the first two pixels of the current set (i.e., transparent pixels) are skipped and the last two pixels (i.e., non-transparent pixels) are rendered. After the jumped-to program code is implemented to process the current set of pixels, processing returns to step 402 to retrieve the next code signal from current row of the encoded image 300.

When the decode processing of FIG. 4 is complete, all of the transparent pixels of the original image will have been skipped and all of the non-transparent pixels will have been rendered.

By processing an encoded image such as encoded image 300 instead of the original image 200, redundant processing otherwise required to determine pixel transparency on a pixel-by-pixel basis is avoided. The present invention, therefore, provides faster display of images that are rendered more than once in a single display and/or over successive displays.

The encoding processing of FIG. 1 may be implemented either during signal generation or during playback. When implemented during signal generation, the encoded image is stored for future playback. When implemented during playback, the encoded image is generated during run time and immediately used to display the original image data. Implementing the encoding processing during signal generation time can save processing overhead during playback, but at the expense of increased data storage requirements and transmission bandwidth utilization. If storage space and/or transmission bandwidth are limited or if sufficient processing power is available during playback, then encoding processing is preferably implemented at run time during playback.

Those skilled in the art will understand that the processing of steps 404–410 may be implemented by two other sets of especially designed program code—one to handle end-of-image processing and the other to handle end-of-row processing. In that case, the main loop of transparency decoding could be represented by two steps: (1) retrieve next code signal from the encoded image and (2) jump to the program code that implements the processing indicated by the current code signal.

In a preferred embodiment, an endec of the present invention is implemented as part of the hardware and software systems described in copending application Ser. No. 08/388,699, filed on Feb. 15, 1995 as attorney docket no. 366431-039, which is incorporated herein by reference in its entirety.

In the preferred embodiment of FIGS. 1–4, the code signals are stored along with the original pixels in an interleaved fashion to form a single encoded image. Those skilled in the art will understand that the present invention covers alternative configurations of the code signals and the original image pixels. For example, the original image can be retained and a separate "code-signal image" can be generated, each "pixel" of which is a code signal corresponding to four pixels of the original image. The encoded image signals can then be decoded by toggling back and forth between the code-signal image and the original image.

In the preferred embodiment of FIGS. 1–4, the processing is related to pixel transparency. Those skilled in the art will understand that endecs of the present invention may be used to encode and decode images whose pixels are to be subjected to processing other than transparency processing, such as, alpha blending (used to create a translucent affect), shadowing (in which some or all of the pixel intensities within a background object are decreased to simulate as shadow cast by a foreground object), and color conversion.

In the preferred embodiment of the FIGS. 1–4, the code signals represent jumps to different sets of program code. In alternative embodiments of the present invention, the code signals may correspond to other information. For example, rather than jumping to different sets of program code, the appropriate sets of program code can be explicitly inserted between the sets of pixels when generating the encoded image. In this way, the processing overhead required to jump to the appropriate program code and then to return from the jump after the program code has been implemented can be avoided. Of course, the size of the encoded image may also increase, but that may be an acceptable price to pay in a particular image processing application.

Those skilled in the art will understand that the present invention may be used to process any pixel images, whether the images are graphics images or video images.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for processing signals, comprising the steps of:
   (a) providing encoded image signals corresponding to an image, wherein:
      the encoded image signals comprise code signals and a plurality of sets of pixels, each set of pixels having two or more pixels and each pixel having a transparency status;
      each code signal corresponds to a set of pixels of the plurality of sets of pixels;
      each set of pixels has one of N different transparency status permutations in accordance with the individual transparency statuses for each pixel of the set of pixels; and
      each code signal has one of N code signal values, each of the N code signal values corresponding to one of the N transparency status permutations wherein the code signal for each set of pixels corresponds to the transparency status permutation for said each set of pixels;
   (b) retrieving a current code signal from the encoded image signals;
   (c) retrieving a current set of pixels corresponding to the current code signal from the encoded image signals;
   (d) processing the current set of pixels for display based on the value of the current code signal;
   (e) repeating steps (b)–(d) for other code signals and other sets of pixels of the plurality of sets of pixels; and
   (f) repeating steps (b)–(e) one or more times.

2. The process of claim 1, wherein the code signals comprise explicit program code for step (d).

3. The process of claim 1, wherein the pixels are interleaved with the code signals.

4. The process of claim 1, wherein step (a) comprises the step of generating the encoded image signals at playback time.

5. The process of claim 1, wherein steps (b)–(e) are implemented two or more times to repeat the processing of the encoded image signals for a single display.

6. The process of claim 1, wherein steps (b)–(e) are implemented two or more times to repeat the processing of the encoded image signals for successive displays.

7. The process of claim 1, wherein step (d) comprises the steps of:
   (1) jumping, using the value of the code signal as a pointer, to a corresponding one of N program code segments especially designed to process sets of pixels having the transparency status permutation of the current set of pixels corresponding to the current code signal; and
   (2) implementing the especially designed program code segment to process the current set of pixels.

8. The process of claim 1, wherein:
   step (d) comprises the steps of:
      (1) skipping any transparent pixels of the current set; and
      (2) rendering any non-transparent pixels of the current set for display.

9. An apparatus for processing signals, comprising:
   (a) means for providing encoded image signals corresponding to an image, wherein:
      the encoded image signals comprise code signals and a plurality of sets of pixels, each set of pixels having two or more pixels and each pixel having a transparency status;
      each code signal corresponds to a set of pixels of the plurality of sets of pixels;
      each set of pixels has one of N different transparency status permutations in accordance with the individual transparency statuses for each pixel of the set of pixels; and
      each code signal has one of N code signal values, each of the N code signal values corresponding to one of the N transparency status permutations wherein the code signal for each set of pixels corresponds to the transparency status permutation for said each set of pixels;
   (b) means for retrieving a current code signal from the encoded image signals;
   (c) means for retrieving a current set of pixels corresponding to the current code signal from the encoded image signals;
   (d) means for processing the current set of pixels for display based on the value of the current code signal;
   (e) means for repeating the processing of means (b)–(d) for other code signals and other sets of pixels of the plurality of sets of pixels; and (f) repeating the processing of means (b)–(e) one or more times.

10. The apparatus of claim 9, wherein the code signals comprise explicit program code for means (d).

11. The apparatus of claim 9, wherein the pixels are interleaved with the code signals.

12. The apparatus of claim 9, wherein means (a) generates the encoded image signals at playback time.

13. The apparatus of claim 9, wherein the processing of means (b)–(e) is implemented two or more times to repeat the processing of the encoded image signals for a single display.

14. The apparatus of claim 9, wherein the processing of means (b)–(e) is implemented two or more times to repeat the processing of the encoded image signals for successive displays.

15. The apparatus of claim 9, wherein means (d):
  (1) jumps, using the value of the code signal as a pointer, to a corresponding one of N program code segments especially designed to process sets of pixels having the transparency status permutation of the current set of pixels corresponding to the current code signal; and
  (2) implements the especially designed program code segment to process the current set of pixels.

16. The apparatus of claim 9, wherein:
  means (d):
    (1) skips any transparent pixels of the current set; and
    (2) renders any non-transparent pixels of the current set for display.

17. A storage medium having stored thereon a plurality of instructions for processing signals, wherein the plurality of instructions, when executed by a processor, cause the processor to perform the steps of:
  (a) providing encoded image signals corresponding to an image, wherein:
    the encoded image signals comprise code signals and a plurality of sets of pixels, each set of pixels having two or more pixels and each pixel having a transparency status;
    each code signal corresponds to a set of pixels of the plurality of sets of pixels;
    each set of pixels has one of N different transparency status permutations in accordance with the individual transparency statuses for each pixel of the set of pixels; and
    each code signal has one of N code signal values, each of the N code signal values corresponding to one of the N transparency status permutations wherein the code signal for each set of pixels corresponds to the transparency status permutation for said for each set of pixels;
  (b) retrieving a current code signal from the encoded image signals;
  (c) retrieving a current set of pixels corresponding to the current code signal from the encoded image signals;
  (d) processing the current set of pixels for display based on the value of the current code signal; and
  (e) repeating steps (b)–(d) for other code signals and other sets of pixels of the plurality of sets of pixels; and
  (f) repeating steps (b)–(e) one or more times.

18. The storage medium of claim 17, wherein the code signals comprise explicit program code for step (d).

19. The storage medium of claim 17, wherein the pixels are interleaved with the code signals.

20. The storage medium of claim 17, wherein step (a) comprises the step of generating the encoded image signals at playback time.

21. The storage medium of claim 17, wherein steps (b)–(e) are implemented two or more times to repeat the processing of the encoded image signals for a single display.

22. The storage medium of claim 17, wherein steps (b)–(e) are implemented two or more times to repeat the processing of the encoded image signals for successive displays.

23. The storage medium of claim 17, wherein step (d) comprises the steps of:
  (1) jumping, using the value of the code signal as a pointer, to a corresponding one of N program code segments especially designed to process sets of pixels having the transparency status permutation of the current set of pixels corresponding to the current code signal; and
  (2) implementing the especially designed program code segment to process the current set of pixels.

24. The storage medium of claim 17, wherein step (d) comprises the steps of:
  (1) skipping any transparent pixels of the current set; and
  (2) rendering any non-transparent pixels of the current set for display.

25. A computer-implemented process for processing signals, comprising the steps of:
  (a) providing an image comprising a plurality of sets of pixels, each set of pixels having two or more pixels and each pixel having a transparency status, wherein each set of pixels has one of N different transparency status permutations in accordance with the individual transparency statuses for each pixel of the set of pixels; and;
  (b) determining the transparency status permutation for a current set of pixels of the image;
  (c) generating a current code signal for the current set of pixels based on the transparency status permutation of the current set of pixels, wherein the current code signal has one of N code signal values, each of the N code signal values corresponding to one of the N transparency status permutations wherein the current code signal corresponds to the transparency status permutation of the current set of pixels;
  (d) generating encoded image signals comprising the current code signal and the current set of pixels; and
  (e) repeating steps (b)–(d) for other sets of pixels of the image.

26. The process of claim 25, wherein the current code signal comprises explicit program code for processing the current set of pixels.

27. The process of claim 25, wherein steps (a)–(e) are implemented at playback time.

28. The process of claim 25, wherein the pixels are interleaved with the code signals.

29. The process of claim 25, further comprising the step of:
  (f) decoding the encoded image signals for display, wherein step (f) comprises the steps of:
    (1) retrieving a current code signal from the encoded image signals;
    (2) retrieving a current set of pixels corresponding to the current code signal from the encoded image signals;
    (3) processing the current set of pixels for display based on the current code signal; and (4) repeating steps (f)(1)–(3) for other code signals and other sets of pixels.

30. The process of claim 29, wherein steps (f)(1)–(4) are implemented two or more times to repeat the processing of the encoded image signals for a single display.

31. The process of claim 29, wherein steps (f)(1)–(4) are implemented two or more times to repeat the processing of the encoded image signals for successive displays.

32. The process of claim 29, wherein step (f)(3) comprises the steps of:
  (i) jumping, using the value of the code signal as a pointer, to a corresponding one of N program code segments especially designed to process sets of pixels having the transparency status permutation of the current set of pixels corresponding to the current code signal; and
  (ii) implementing the especially designed program code segment to process the current set of pixels.

33. The process of claim 29, wherein step (f)(3) comprises the steps of:
  (1) skipping any transparent pixels of the current set; and
  (2) rendering any non-transparent pixels of the current set for display.

34. An apparatus for processing signals, comprising:
  (a) means for providing an image comprising a plurality of sets of pixels, each set of pixels having two or more pixels and each pixel having a transparency status, wherein each set of pixels has one of N different transparency status permutations in accordance with the individual transparency statuses for each pixel of the set of pixels;
  (b) determining the transparency status permutation for a current set of pixels of the image;
  (c) generating a current code signal for the current set of pixels based on the transparency status permutation of the current set of pixels, wherein the current code signal has one of N code signal values, each of the N code signal values corresponding to one of the N transparency status permutations wherein the current code signal corresponds to the transparency status permutation of the current set of pixels;
  (d) means for generating encoded image signals comprising the current code signal and the current set of pixels; and
  (e) means for repeating the processing of means (b)–(d) for other sets of pixels of the image.

35. The apparatus of claim 34, wherein the current code signal comprises explicit program code for processing the current set of pixels.

36. The apparatus of claim 34, wherein the processing of means (a)–(e) is implemented at playback time.

37. The apparatus of claim 34, wherein the pixels are interleaved with the code signals.

38. The apparatus of claim 34, further comprising:
  (f) means for decoding the encoded image signals for display, wherein means (f):
    (1) retrieves a current code signal from the encoded image signals;
    (2) retrieves a current set of pixels corresponding to the current code signal from the encoded image signals;
    (3) processes the current set of pixels for display based on the current code signal; and
    (4) repeats the processing of means (f)(1)–(3) for other code signals and other sets of pixels.

39. The apparatus of claim 38, wherein the processing of means (f)(1)–(4) is implemented two or more times to repeat the processing of the encoded image signals for a single display.

40. The apparatus of claim 38, wherein the processing of means (f)(1)–(4) is implemented two or more times to repeat the processing of the encoded image signals for successive displays.

41. The apparatus of claim 38, wherein means (f)(3):
  (i) jumps, using the value of the code signal as a pointer, to a corresponding one of N program code segments especially designed to process sets of pixels having the transparency status permutation of the current set of pixels corresponding to the current code signal; and
  (ii) implements the especially designed program code segment to process the current set of pixels.

42. The apparatus of claim 38, wherein means (f)(3):
  (1) skips any transparent pixels of the current set; and
  (2) renders any non-transparent pixels of the current set for display.

43. A storage medium having stored thereon a plurality of instructions for processing signals, wherein the plurality of instructions, when executed by a processor, cause the processor to perform the steps of:
  (a) providing an image comprising a plurality of sets of pixels, each set of pixels having two or more pixels and each pixel having a transparency status, wherein each set of pixels has one of N different transparency status permutations in accordance with the individual transparency statuses for each pixel of the set of pixels;
  (b) determining the transparency status permutation for a current set of pixels of the image;
  (c) generating a current code signal for the current set of pixels based on the transparency status permutation of the current set of pixels, wherein the current code signal has one of N code signal values, each of the N code signal values corresponding to one of the N transparency status permutations wherein the current code signal corresponds to the transparency status permutation of the current set of pixels;
  (d) generating encoded image signals comprising the current code signal and the current set of pixels; and
  (e) repeating steps (b)–(d) for other sets of pixels of the image.

44. The storage medium of claim 43, wherein the current code signal comprises explicit program code for processing the current set of pixels.

45. The storage medium of claim 43, wherein the steps (a)–(e) are implemented at playback time.

46. The storage medium of claim 43, wherein the pixels are interleaved with the code signals.

47. The storage medium of claim 43, wherein the plurality of instructions cause the computer to perform the further step of:
  (f) decoding the encoded image signals for display, wherein step (f) comprises the steps of:
    (1) retrieving a current code signal from the encoded image signals;
    (2) retrieving a current set of pixels corresponding to the current code signal from the encoded image signals;
    (3) processing the current set of pixels for display based on the current code signal; and
    (4) repeating steps (f)(1)–(3) for other code signals and other sets of pixels.

48. The storage medium of claim 47, wherein steps (f)(1)–(4) are implemented two or more times to repeat the processing of the encoded image signals for a single display.

49. The storage medium of claim 47, wherein steps (f)(1)–(4) are implemented two or more times to repeat the processing of the encoded image signals for successive displays.

50. The storage medium of claim 47, wherein step (f)(3) comprises the steps of:

(i) jumping, using the value of the code signal as a pointer, to a corresponding one of N program code segments especially designed to process sets of pixels having the transparency status permutation of the current set of pixels corresponding to the current code signal; and (ii) implementing the especially designed program code segment to process the current set of pixels.

51. The storage medium of claim 47, wherein step (f)(3) comprises the steps of:

(1) skipping any transparent pixels of the current set; and (2) rendering any non-transparent pixels of the current set for display.

* * * * *